Sept. 1, 1936.  J. W. ALEXANDER ET AL  2,052,687
WIRELESS RECEIVING SET
Filed Oct. 9, 1933
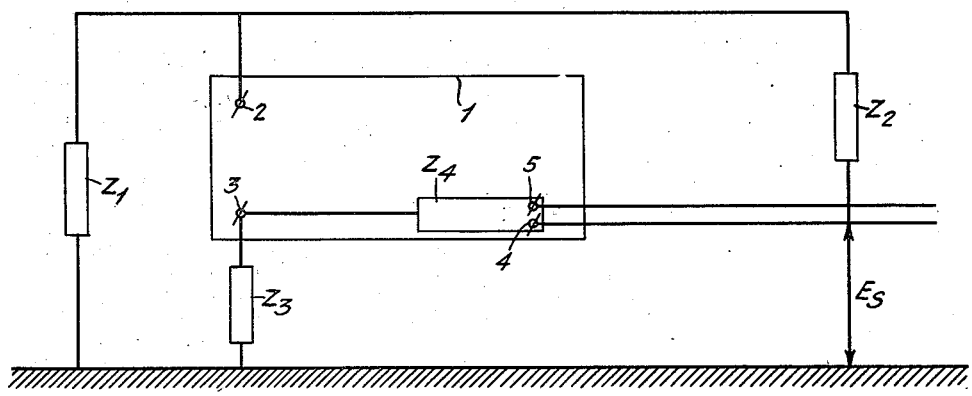
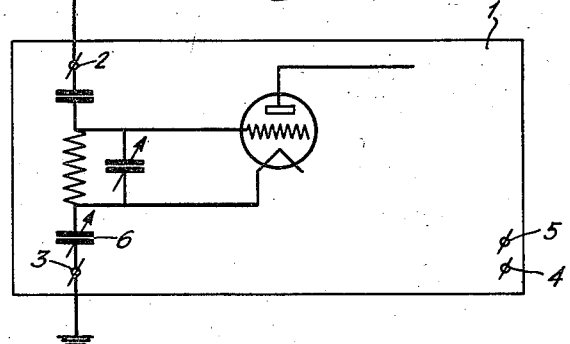
INVENTORS
JOHAN WILLEM ALEXANDER
BALTHASAR VAN DER POL
BY
ATTORNEY Patented Sept. 1, 1936

2,052,687

UNITED STATES PATENT OFFICE 2,052,687

WIRELESS RECEIVING SET

Johan Willem Alexander and Balthasar van der Pol, Eindhoven, Netherlands, assignors to Radio Corporation of America, a corporation of Delaware Application October 9, 1933, Serial No. 692,714 In Germany September 9, 1932

4 Claims. (Cl. 250—20)

This invention is concerned with wireless receiving sets supplied from an alternating or direct current supply circuit.

The invention has for its object to provide a device operative to make inoffensive the disturbing oscillations received from the supply circuit. It is well known that the electric supply circuit may be a source of wireless disturbances essentially due to loads connected to the supply circuit and to other devices arranged in the vicinity of the supply circuit conductors. These disturbances, which are transmitted along the feed-lines and penetrate into the receiving set sometimes by way of the inner capacities of supply transformers and high tension supply units, sometimes by way of the antenna, may materially impair reception and even prohibit it under certain conditions.

It has already been proposed to make these disturbances inoffensive by preventing them from penetrating into the receiving set along the feed lines. It is well known to include for this purpose in the feed lines, preferably between supply circuit and feeding device, a filter that arrests the high frequency oscillations received from the supply circuit and that allows the undisturbed passage of the low frequency supply current.

As this measure does not prevent the disturbances from penetrating into the receiving set by way of the antenna it has been found to be ineffective.

A further solution by means of which better results were obtained is based on the recognition of the fact that the impedance antenna-earth ($Z_1$), the impedance antenna-supply circuit ($Z_2$), the impedance between the point to be earthed of the input circuit and the earth ($Z_3$) and the impedance between the point to be earthed of the input circuit and the supply circuit ($Z_4$) constitute the arms of a bridge duplex-connection in which the input circuit of the receiver set is located in one of the diagonals, whereas the disturbing voltages occur in the other diagonal, and which consists in that one of the feed lines includes an inductance which is connected through a condenser to the earth terminal of the wireless receiving set and is so proportioned that the bridge connection is balanced. This circuit arrangement ensures that the receiver is freed from disturbances for the frequency to which the input circuit of the receiver circuit arrangement is tuned. In the case of the tuning being altered the inductance included in one of the feed lines must be varied.

According to the invention the impedances that form the arms of the bridge connection are such that the balancing condition $Z_1Z_4=Z_2Z_3$ is independent of the frequency of the oscillations to be received.

In order that the invention may be clearly understood and readily carried into effect it is described more fully with reference to the accompanying drawing, wherein Figures 1 and 2 are schematic diagrams used to describe the invention and Figure 3 is a diagramatic representation of a preferred form of the invention.

The most simple embodiment of a circuit arrangement according to the invention is that in which each of the impedances that constitute the arms of the bridge-connection is a capacitive resistance, as both $Z_1$ and $Z_2$ as well as $Z_4$ are essentially capacitive and the earth-line can be made capacitive by the insertion of a condenser. As, however, the impedances $Z_1$, $Z_2$ and $Z_4$ are not purely capacitive it is possible that by the insertion of the series capacity in the earth-line a bridge perfectly balanced for any frequency cannot yet be obtained. In order to neutralize these small divergences the capacity included in the earth-line is preferably constructed as a variable condenser. It is also possible to neutralize these small divergencies by making one or more of the impedances $Z_1$, $Z_2$ and $Z_4$ adjustable. This can be effected for example by connecting a variable impedance in parallel with the said impedances.

The method of balancing the bridge-connection, in which a capacity is included in the earth-line, is by far preferable to the well known method indicated before in which an inductance is included in one of the feed-lines and is connected through a condenser to the earth terminal. The latter type of circuit arrangement has the disadvantage that in the case of the earth-terminal being touched when it is not connected to earth there is danger of a shock for the reason that this terminal is under tension. Indeed, when the earth terminal is touched the impedance of the condenser in series with the person that touches the earth terminal is always connected between a feed line and earth. In this case, a fairly considerable part of the low frequency voltage existing between this feed line and the earth is present between the earth terminal and earth.

Referring to Figure 1, a diagrammatically illustrated wireless receiving set 1 is provided with an aerial connecting terminal 2, an earth terminal 3 and two supply circuit-connecting terminals 4 and 5. The total impedance antenna-earth is assumed to be replaced by an impedance $Z_1$ existing between the aerial connecting terminal 2 and the earth. The electromotive force of the desired signal may be assumed to be active in series with the said impedance. Between the aerial terminal 2 and the feed lines is an impedance $Z_2$; $Z_3$ and $Z_4$ are the impedances between the cathode of the input tube of the receiver circuit arrangement and the earth and between the cathode of the input tube and the supply circuit respectively. The disturbing voltage occurring between the supply circuit conductors and the earth is designated by $E_s$.

When illustrated in this manner it will be appreciated that the various impedances constitute the arms of a bridge connection which is shown in Figure 2 in a simplified manner. In one of the diagonals is active the disturbing signal $E_s$, whereas the input circuit of the receiver set 1 is located in the other diagonal.

According to the invention the impedances $Z_1$, $Z_2$ $Z_3$ and $Z_4$ are such that the balancing condition $Z_1Z_4=Z_2Z_3$ is independent of frequency.

Figure 3 shows a receiver circuit arrangement in which a condenser 6 is included in the earthline. This condenser, which preferably is a variable condenser, is located between the cathode of the input tube and the earth terminal 3 of the set and can be operated with a particular knob. Preferably, this condenser is mechanically coupled to the tuning condenser.

We claim:

1. A radio receiver of the type provided with an input circuit and means for connecting the receiver input to an antenna and to ground or its equivalent, said connections being made through suitable terminals associated with the receiver, a power supply line for energizing the receiver, said system as a whole having an antenna to earth impedance, an antenna to power supply circuit impedance, an input circuit to ground impedance and an input circuit to power supply circuit impedance, said four impedances being arranged in said system so as to form a substantially balanced bridge circuit the arms of which are formed by the impedances, means for connecting the power supply circuit in one diagonal of the bridge circuit and means for connecting the input circuit of the receiver across the other diagonal of the bridge whereby the receiver input circuit is unaffected by the power supply circuit.

2. In a radio receiving system as described in the next preceding claim further characterized by that the arms of the bridge include capacitive impedances.

3. In a system as described in claim 1 further characterized by that input circuit to ground impedance includes a variable capacity whereby the bridge circuit may be balanced for any frequency adapted to be received by the receiver.

4. A receiving circuit as described in claim 1 further characterized by that there is provided a variable tuning condenser for tuning the receiver so as to receive any frequency of a predetermined band of frequencies and wherein at least a portion of the impedance between the input circuit and ground comprises a variable impedance device, said variable impedance device being mechanically coupled to the tuning instrumentality whereby both thereof may be varied simultaneously, thereby automatically maintaining the bridge in a balanced condition for any position of the tuning instrumentality.

JOHAN WILLEM ALEXANDER.
BALTHASAR van der POL.